United States Patent [19]
Nishiyama

[11] Patent Number: 5,016,046
[45] Date of Patent: May 14, 1991

[54] AUTOMATIC EXPOSURE DEVICE FOR COPYING MACHINE

[75] Inventor: Haruo Nishiyama, Kyoto, Japan

[73] Assignee: Sharp Kabushiki Kaisha, Osaka, Japan

[21] Appl. No.: 440,304

[22] Filed: Nov. 22, 1989

[30] Foreign Application Priority Data

Nov. 25, 1988 [JP] Japan ................. 63-298942

[51] Int. Cl.⁵ .................................. G03B 27/72
[52] U.S. Cl. ............................ 355/68; 355/69
[58] Field of Search .............. 355/68, 69, 214, 77

[56] References Cited

U.S. PATENT DOCUMENTS 4,540,279 9/1985 Irie et al. ......................... 355/69
4,843,208 6/1989 French et al. .................. 219/121.51

FOREIGN PATENT DOCUMENTS 0181762 11/1982 Japan .......................... 219/121.44

Primary Examiner—L. T. Hix
Assistant Examiner—D. Rutledge

[57] ABSTRACT

An automatic exposure device for a copying machine includes a lamp for exposing an original, a power source for variably supplying electric power to the lamp, a first sensor for determining the quantity of light reflected from the original, a second sensor for determining the quantity of light of the lamp, a controller for increasing the electric power supplied to the lamp by the power source proportionally to decrease in the quantity of the light determined by the first sensor, and a maximum electric poewr setting device for setting the maximum electric power applicable to the lamp by the power source at a high level proportional to decrease in the quantity of light determined by the second sensor.

15 Claims, 5 Drawing Sheets

AUTOMATIC EXPOSURE DEVICE FOR COPYING MACHINE

BACKGROUND OF THE INVENTION

1. Field of the Invention

The present invention relates to an improved automatic exposure device for a copying machine, for setting an appropriate amount of light from a light source when the copying machine copies an image, and making use of light directed to an original from a light source and reflected from the original.

2. Description of the Related art

An ordinary automatic exposure device detects the quantity of the light reflected from an original with a sensor and automatically controls electric power supplied to a light source for irradiating the original, in accordance with output detected by the sensor. When the sensor senses that the original is dark, the automatic exposure device supplies more power to the light source. When the sensor senses that the original is light, the automatic exposure device reduces the power supplied to the light source. In such an operation, however, without setting the maximum regulation level of supplied power (control of the duty ratio, usually), the light source is made unnecessarily bright. For example, if there is in the original a character and a thin line close to a solid black area, the sensor senses that the whole image is thick in density and, accordingly, the light source is lit up brightly. As a result, because of an excessively large quantity of light the result in the character and the thin line are very thin or disappear, although the image produced would not be fogged. Therefore, in the usual automatic exposure device, supplied power has a maximum regulation level so that no character and thin line are thinned nor disappear.

Some kinds of light sources employed in a copying machine are highly influenced by temperature or the like. As a result, a rise in lighting up may become very dull. For example, a fluorescent lamp becomes dull in its rise when the temperature around it is low. As stated above, however, electric power supplied to the fluorescent lamp (light source) is limited at or below the maximum regulation level. As a result, in the case where original is copied when the fluorescent lamp is insufficient in its rise, exposure is performed merely at the maximum level set in advance, and a fogged image is only obtained because of an insufficient quantity of light.

To eliminate the above disadvantages, the applicants of the present invention proposed a device for presetting the maximum regulation level at several levels and shifting the maximum regulation level in accordance to a state of a rise in the quantity of light in U.S. Pat, Application No. 359,289 (filed on May 31, 1989).

However, in selecting an appropriate one from the preset several levels for the maximum regulation level in accordance with the state of a rise of the light source, the quantity of light of the light source may be considerably changed in shifting the level to have an adverse effect on the quality of an image produced. For example, in the case where solid black original is copied, the quantity of the light reflected from the original is very small when the rise of the light source is insufficient and, consequently, the maximum regulation level is set high and a large amount of electric power is supplied to the light source. After that, since the quantity of the light reflected from the original is increased as the quantity of light at the rise time becomes sufficient, the maximum regulation level is shifted. At that point of time, electric power supplied to the light source is extremely changed, and the quantity of light is widely varied. This may cause irregularity in density in the image produced.

SUMMARY OF THE INVENTION

An automatic exposure device for a copying machine according to the present invention includes a lamp for exposing an original, a power source for variably supplying electric power to the lamp. There is a first sensor for determining the quantity of light reflected from the original, and a second sensor for determining the quantity of light of the lamp. Control means are used for increasing the electric power supplied to the lamp by the power source proportionally to decrease in the quantity of the light determined by the first sensor. There is included a maximum electric power setting means for setting the maximum electric power applicable to the lamp by the power source at a high level proportional to decrease in the quantity of light determined by the second sensor.

Preferably, the lamp is a fluorescent lamp, and the power source is an inverter. Output frequency of the inverter may be approximately 1 KHz.

Preferably, the control means includes a pulse width modulation circuit which receives an output from the first sensor and outputs a pulse width modulation (PWM) signal to the inverter to control output electric power of the inverter.

Preferably, the maximum electric power setting means includes a circuit for controlling the output of the first sensor to the pulse width modulation circuit in accordance with the quantity of light of the lamp.

As the first and second sensor, Auto Exposure (AE) sensors which are well-known in this field are used. The AE sensors are preferably photodiodes or phototransistors capable of measuring quantity of light (visible light) of a wavelength of 400 to 800 nm, for example.

In accordance with the present invention, the quantity of light of the light source is directly detected, and the maximum regulation level of power supplied to the light source is successively set on the basis of real time in accordance with the result of the detection, so that an extreme change in the maximum regulation level can be avoided.

DETAILED DESCRIPTION OF THE PREFERRED EMBODIMENTS

Figure 1:
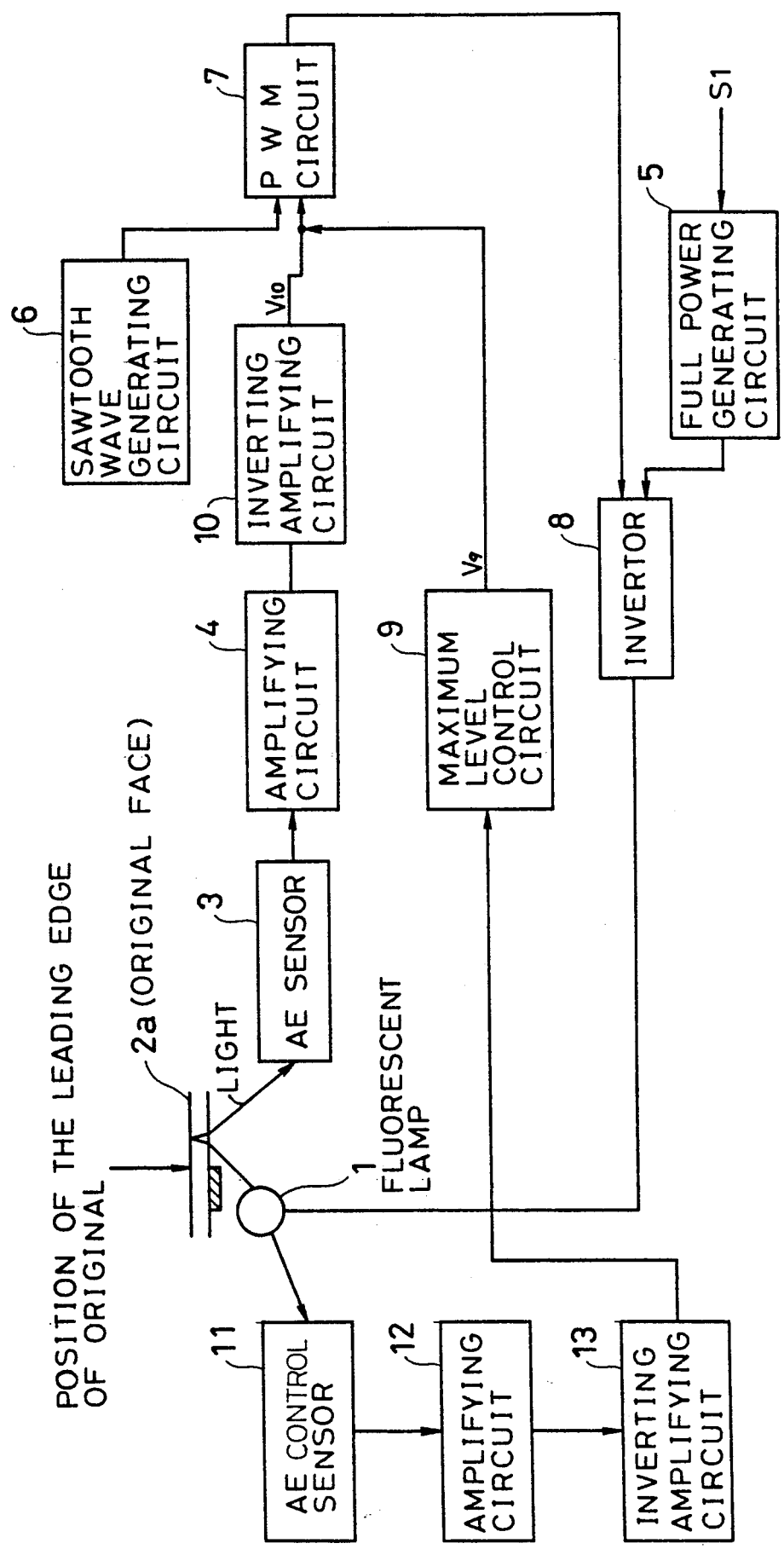
FIG. 1 is a block diagram showing an embodiment of an automatic exposure device according to the present invention.
Figure 5:
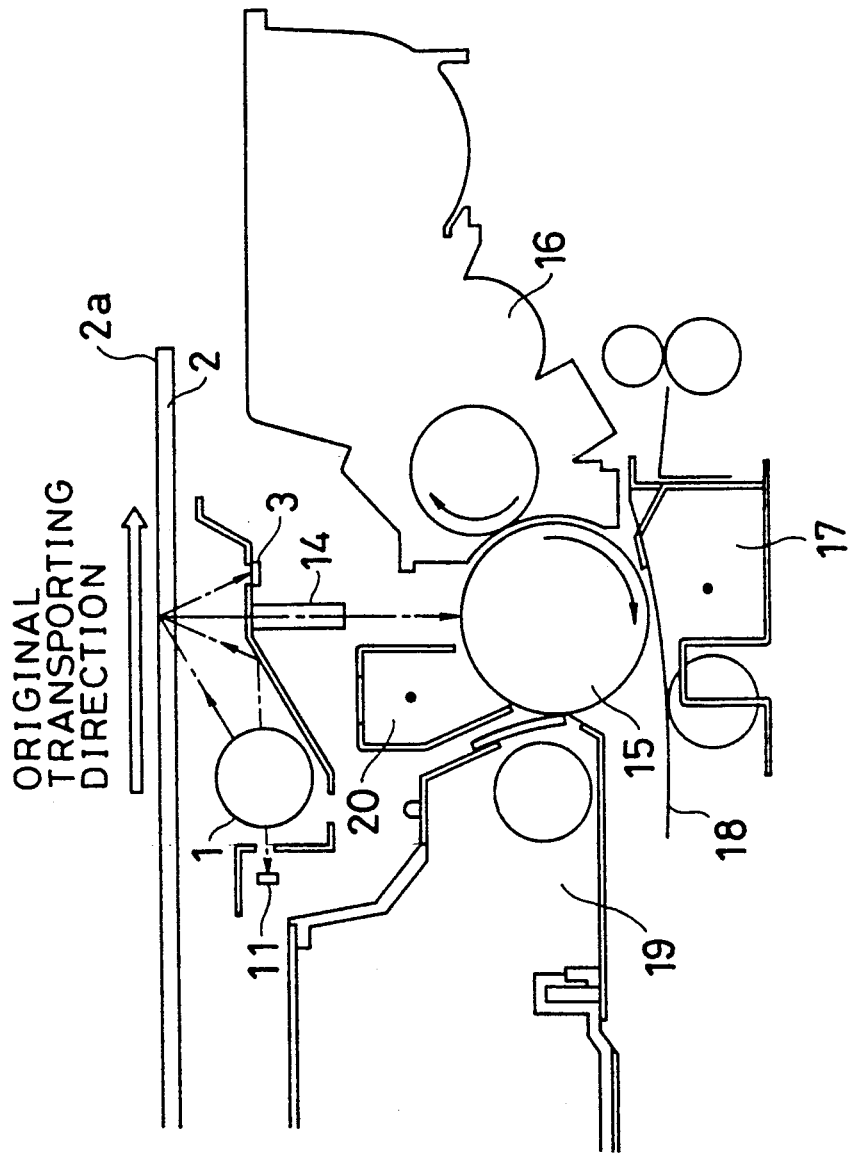
FIG. 5 is a diagram showing an example of an arrangement of an AE sensor and an AE control sensor.

FIG. 1 is a block diagram showing an embodiment of the present invention, and FIG. 5 is a diagram showing an arrangement of the embodiment. In these figures, an original is set on an original glass plate 2 which moves in a direction corresponding to an arrow, and irradiated by light from a fluorescent lamp 1. The light reflected from an original face 2a passes through an imaging lens 14 to form an electrostatic latent image on a photoconductor drum 15. The electrostatic latent image is developed by a developing device 16, and the developed image is transferred on a recording paper 18 by a transfer charger 17. After the transfer, a cleaning device 19 removes the remaining toner from the photoconductor drum 15, and a main charger 20 has the photoconductor drum 15 uniformly accumulate electric charge. The fluorescent lamp 1 is usually slow in a rise in quantity of light at low temperature compared to a case at ordinary temperature. The light reflected from the original face 2a is sensed by an automatic exposure (AE) sensor 3 so that quantity of the light is detected, and an amplifying circuit 4 amplifies voltage proportional to the quantity of light into an appropriate level. After that, an inverting amplifying circuit 10 receives an output from the amplifying circuit 4, inverts and amplifies it, and transmits it to a PWM signal generating circuit 7. The PWM signal generating circuit 7 compares a saw tooth wave outPutted from a saw tooth wave generating circuit 6 with an output from the inverting amplifying circuit 10 or a maximum level control circuit 9 stated hereinafter to produce a signal for pulse width modulation (PWM).

Figure 2:
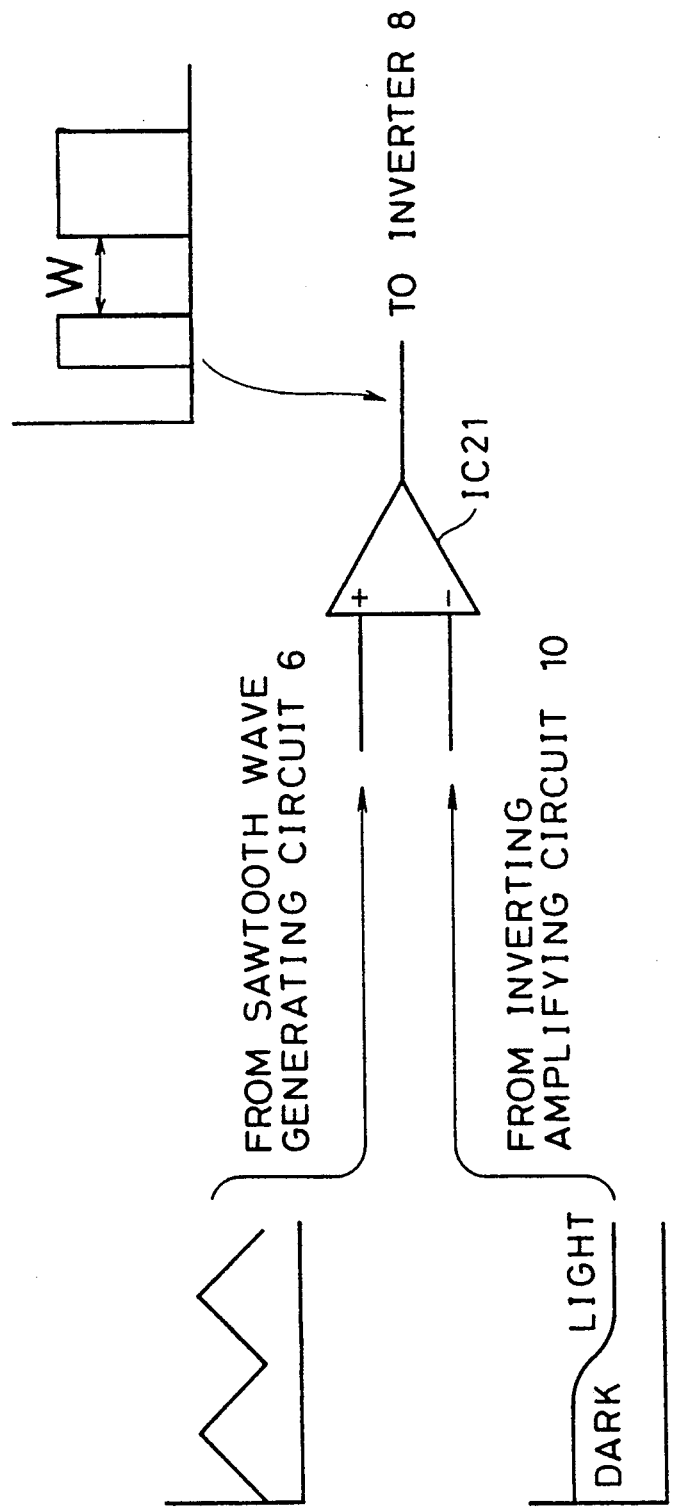
FIG. 2 is a view showing a structure of a PWM circuit.

FIG. 2 shows a PWM circuit. The PWM circuit comprises an integrated circuit IC 21 including a comparator, receives the saw tooth wave from the saw tooth wave generating circuit 6 at its positive input terminal and the outputs from the inverting amplifying circuit 10 and the maximum level control circuit 9 at its negative input terminal. In FIG. 2. the PWM circuit receives an output signal from the inverting amplifying circuit 10. The output signal level is inversely proportional to the quantity of light incident on the AE sensor 3 as shown in the figure. When the quantity of the light reflected from the original is large (the original is light), the output sisnal level is low, and when the quantity of the light reflected from the original is small (the original is dark), the output signal level is high. The circuit IC 21 compares the output signal level of the inverting amplifying circuit 10 with the saw tooth wave to output a PWM wave of which pulse width W is modulated as shown in FIG. 2.

The PWM wave is transmitted to an inverter 8, and the inverter 8 controls a duty cycle of high frequency power to supply the fluorescent lamp in accordance with a pulse width of the PWM wave. Namely. the inverter 8 prolongs ON-time to supply increased power to the fluorescent lamp and make it brighter when the quantity of the light reflected from the original is small. On the contrary, when the quantity of the light reflected from the original is large, the inverter 8 shortens the ON-time to make the fluorescent lamp darker.

The inverter 8 has its input connected to a full power generating circuit 5, and the full power generating circuit 5 outputs a full power supply signal (a low level digital signal) to the inverter 8 from a pushing of copy button (not shown) till a control unit (not shown) receives a signal S1. The inverter 8, when receiving the full power supply signal, ignores the above PWM wave but supplies full power to the fluorescent lamp 1. The signal S1 rises immediately before a period from the pushing of the copy button till the light from the fluorescent lamp 1 irradiates from the head edge to the tail edge of the original on the original glass plate 2 (a period determined in accordance with a copy magnification) passes (see FIG. 1). When the signal S1 rises, the full power generating circuit 5 produces no output, so that the inverter 8 controls the fluorescent light 1 depending upon the above PWM wave.

The automatic exposure (AE) control sensor 11 detects quantity of light from the light source 1. The AE control sensor 11, as shown in FIG. 5, is disposed in a position where it directly receives the light from the light source 1 to detect the quantity of the light almost accurately. The light incident on the AE control sensor 11 is converted into a voltage signal proportional to the quantity of light. The voltage signal is amplified into an appropriate level by an amplifying circuit 12. inverted and amplified by an inverting amplifying circuit 13 and thereafter inputted to the maximum level control circuit 9. The maximum level control circuit 9 divides the output level of the inverting amplifying circuit 13 to drop the output level to an appropriate level and applies a signal at the level to the PWM generating circuit 7 as a maximum level control signal. The maximum level control signal becomes lower as the quantity of the light of the fluorescent lamp is increased (the fluorescent lamp is made brighter), and the signal becomes higher as the quantity of the light of the fluorescent lamp is decreased (the fluorescent lamp is made darker).

Figure 3:
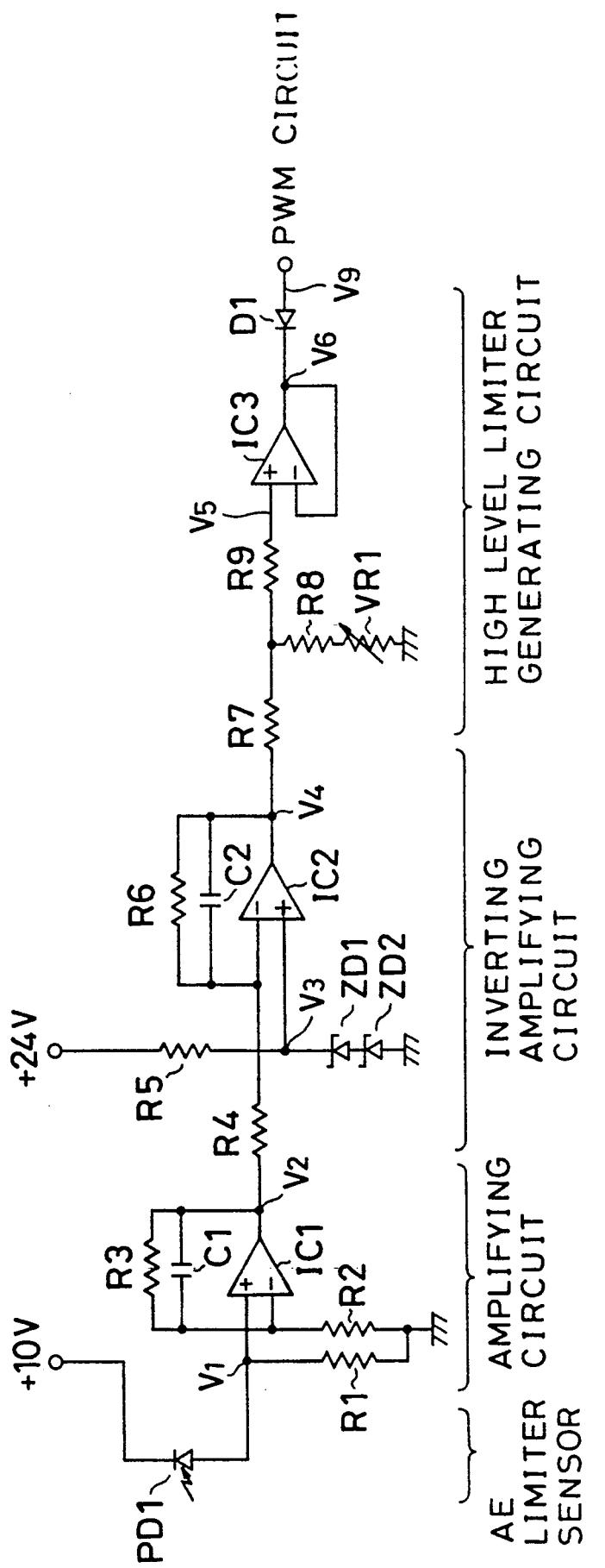
FIG. 3 is a diagram showing an example of a structure of a maximum level regulation circuit.

FIG. 3 is a diagram showing an example of a circuit consisting of various stages from the AE control sensor to the maximum level control circuit.

In FIG. 3, PD 1 is a photodiode which is an AE control sensor 11 for detecting quantity of light of the light source 1. An amplifying circuit converts current outputted from the photodiode PD1 into voltage in a resistance R1, and amplifies a voltage value V1 in an operational amplifier IC1. Thus, output voltage $V_2$ of the amplifying circuit 12 is as follows:

$$V_2 = V_1 \{(R1 + R2)/R1\}$$

The inverting amplifying circuit 13 amplifies the difference of the output voltage $V_2$ of the amplifier IC1 from a reference voltage V3 predetermined by zener diodes AD1, AD2. Namely, an output voltage $V_4$ of an operational amplifier IC2 is as follows:

$$V_4 = V_3 - R6\{(V_1 - V_3)/R4\} = V_3 - (R6/R4) \cdot (V_1 - V_3)$$

The maximum level control circuit divides the output of the amplifier IC2 through resistances R7, R8 and VR1 to apply to an operational ampliFier IC3. An output of the amplifier IC3 is fed back to a negative input terminal of the amplifier IC3, and an equation is given as follows:

$$V_5 = V_6$$

A voltage $V_6$ is applied to a cathode of a diode D1, and the diode D1 has its anode connected to the PWM circuit 7. Accordingly, assuming that forward voltage drop of the diode D1 is $V_{FD1}$, $$V_9 = V_6 + V_{FD1}$$

Voltage of $V_9$ or above is not applied to the PWM circuit 7. Eventually, the voltage $V_9$ is the maximum control level, and output voltage of the inverting amplifying circuit 10 is not to be $V_9$ or above. Namely. assuming that an output signal level of the inverting amplifying circuit 10 is $V_{10}$, the signal level $V_{10}$ is applied to the PWM circuit 7 when $V_{10} < V_9$, and the voltage $V_9$ is applied to the PWM circuit 7 when $V_{10} \geq V_9$, since output current of the circuit 10 is absorbed into the amplifier IC3 through the diode D1. On the other hand, when a rise in the quantity of the light of the fluorescent lamp 1 is insufficient because of low temperature or the like, the quantity of light the AE control sensor 11 detects is small, so that the outPut from the maximum level control circuit 9. namely, the maximum control level is set large. Accordingly, when the quantity of the light of the light source does not reach a predetermined amount in a rise time in the light source, or when the original is almost solid black and the light reflected from the original is small, a large maximum control level is set by the maximum level control circuit 9, so that the PWM wave has a large pulse width to supply a large power to the fluorescent lamp 1. Further, the maximum control level is continuously reduced as the quantity of the light of the light source is increased. In this way. the maximum control level is continuously varied (is set) on the basis of real time in accordance with the quantity of the light of the light source, and hence no extreme change in the maximum control level arises.

Figure 4:
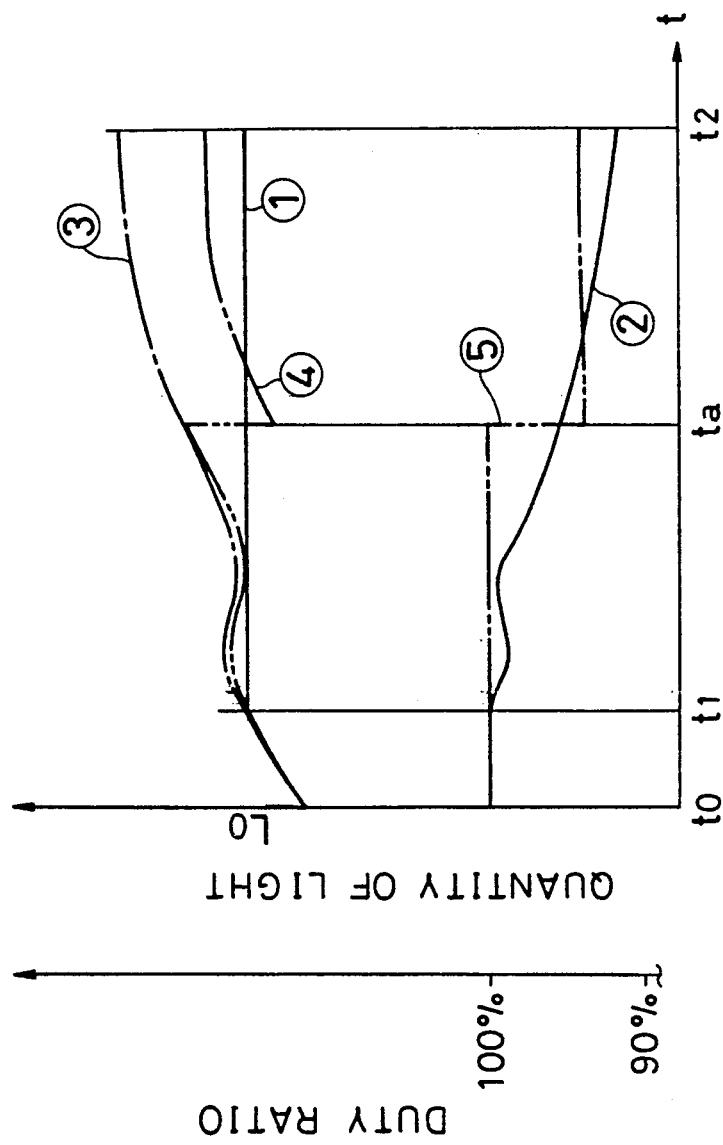
FIG. 4 is a diagram showing a variation in the regulation quantity of light of a light source.

FIG. 4 is a diagram showing a change in a regulation quantity of light of a fluorescent lamp. The regulation quantity of light corresponds to a quantity of light irradiated when the output of an AE sensor is small, namely, the quantity of light of the light source at a rise time is very small or when original to be copied is almost solid black.

A value $L_0$ in FIG. 4 represents the optimum regulation quantity of light in imaging. When the quantity of light of this value is exceeded, a character and a thin line close to a solid black part in the original would be imaged extremely thin or sometimes disappear.

A curve ③ represents a variation in the quantity of light in the case where the iluorescent lamp is continuously lit up with a fixed duty ratio of 100%. The quantity of light exceeds the optimum regulation quantity of light $L_0$ at time t1 and tends to continuously increase thereafter. A curve ④ represents a variation in the regulation quantity of light in shifting the maximum regulation level between alternative levels in accordance with the output of the AE sensor. At the initial stage, the maximum regulation level is set high because a state of rise in the quantity of light of the fluorescent lamp is not good. However, if the quantity of light detected by the AE sensor reaches a predetermined quantity of light (at time $T_a$), the maximum regulation level is shifted to low. Then, the regulation quantity of light is suddenly decreased as shown in FIG. 4. and a disadvantage arises that irregularity in density is caused in a produced image when solid original is copied. A curve ⑤ represents a duty ratio.

A curve ① represents a variation in the regulation quantity of light in the case where the automatic exposure device of this embodiment is used in the copying machine. As can be seen, the quantity of light is almost in agreement with the optimum regulation quantity of light $L_0$. According to the present invention, the maximum regulation level is successively varied corresponding to the quantity of light detected in the AE control sensor 11, and the duty ratio is shown in a curve ②. Specifically, since the quantity of light detected by the AE control sensor 11 is small until the detected quantity of light reaches the optimum regulation quantity of light $L_0$, the maximum regulation level is set at the maximum duty ratio (100%). After that, however, the maximum regulation level is successively varied (set) in accordance with an increase in the quantity of light and, accordingly, there is no possibility that the regulation quantity of light is extremely varied as shown in the curve ④. Thus. no irregularity of density is caused in the produced image when solid black original is copied with the automatic exposure device of the present invention.

Original except for solid black one is copied under the control of a duty ratio of the light source based upon values detected by the AE sensor.

As has been described, according to the present invention, since the maximum regulation level is set on the basis of real time in accordance with quantity of direct light of the light source, a variation in the maximum regulation level is moderate, so that when a copying machine copies at the maximum regulation level (solid black original is copied), for example, extreme change in the quantity of light may not caused and, consequently, irregularity of density in an image produced can be avoided.

What is claimed is:

1. An automatic exposure device for a copying machine, comprising:
    a lamp for exposing an original;
    a power source for supplying variable amounts of electric power to said lamp;
    a first sensor for sensing the quantity of light of said lamp;
    a second sensor for sensing the quantity of light of said lamp;
    control means for increasing the amount of electric power supplied to said lamp by said power source proportionally to the decrease in the quantity of the light determined by said first sensor; and
    maximum electric power setting means for setting the maximum amount of electric power that can be supplied to said lamp by said power source, the maximum amount of electric power being dependent upon the quantity of light sensed by said second sensor.

2. A device according to claim 1, wherein said lamp is a fluorescent lamp, and said power source is an inverter.

3. A device according to claim 2, wherein said control means includes a pulse width modulation circuit which receives an output from said first sensor and outputs a pulse width modulation signal to said inverter to control output electric power of said inverter.

4. A device according to claim 3, wherein said maximum electric power setting means includes a circuit for controlling the output of said first sensor to said pulse width modulation circuit in accordance with said quantity of light of said lamp.

5. An automatic exposure device for a copying machine, comprising:
    a lamp for exposing an original document;
    a power source for supplying a variable amount of electric power to said lamp;
    a first sensor for sensing the quantity of light reflected from said original document;
    a second sensor for sensing the quantity of light of said lamp;
    control means for increasing or decreasing the amount of electric power supplied to said lamp by said power source proportionally to decrease or increase in the quantity of the light determined by said first sensor; and electric power setting means for setting the maximum amount of electric power that can be supplied to said lamp by said power source, the maximum amount of electric power being set in inverse proportion to the quantity of light sensed by the second sensor.

6. The apparatus of claim 5, wherein said lamp is a fluorescent lamp, and said power source is an inverter.

7. The apparatus of claim 6, wherein said control means includes a pulse width modulation circuit which receives an output from said first sensor and outputs a pulse width modulation signal to said inverter to control output electric power of said inverter.

8. The apparatus of claim 7, wherein said electric power setting means includes a circuit for controlling the output of said first sensor to said pulse width modulation circuit in accordance with said quantity of light of said lamp.

9. An automatic exposure device for a copying machine, comprising:
- a lamp for exposing an original document;
- a power source for supplying a variable amount of electric power to said lamp;
- a first sensor for sensing the quantity of light reflected from said original document;
- a second sensor for sensing the quantity of light of said lamp;
- control means for varying the amount of electric power supplied to said lamp by said power source, the amount being inversely proportional to the quantity of the light sensed by said first sensor; and
- electrical power setting means responsive to said second sensor for setting a maximum amount of power than can be supplied to said lamp by said power source, the maximum amount of power being inversely proportional to the quantity of light sensed by the second sensor.

10. The apparatus of claim 9 wherein said lamp is a fluorescent lamp, and said power source is an inverter.

11. The apparatus of claim 10, wherein the control means includes a pulse width modulation circuit which receives an output from said first sensor and outputs a pulse width modulation signal to said inverter to control output electric power of said inverter.

12. The apparatus of claim 11 wherein the electric power setting means includes a circuit for controlling the output of said first sensor to said pulse width modulation circuit in accordance with said quantity of light of said lamp.

13. A method of controlling the intensity of a lamp of a copying machine for copying an original document comprising the steps of:
(a) sensing the reflected light from the original document using a first sensor;
(b) sensing light directly from the lamp by using a second sensor;
(c) supplying electrical power to said lamp, the amount of the power being inversely proportional to the amount of light sensed by said first sensor; and
(d) setting the maximum level of power that can be supplied to the lamp in step (c) in proportion to the amount of light emitted directly by said lamp.

14. The method of claim 13 wherein the maximum level of power that can be supplied to said lamp is raised when the quantity of light sensed is a first value and the maximum level is lowered when the quantity of light is a second value.

15. The method of claim 14 wherein said first value is lower than said second value.

* * * * *